(12) United States Patent
Song et al.

(10) Patent No.: US 11,665,231 B1
(45) Date of Patent: May 30, 2023

(54) METHOD FOR GENERATING AND MANAGING THREE-DIMENSIONAL COORDINATE SYSTEM BASED ON TRANSMISSION DELAY HAVING O(N) OVERHEAD

(71) Applicant: POSTECH RESEARCH AND BUSINESS DEVELOPMENT FOUNDATION, Pohang-si (KR)

(72) Inventors: Hwang Jun Song, Pohang-si (KR); Seung Gyu Ji, Pohang-si (KR); Hyun Min Noh, Incheon (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 17/565,277

(22) Filed: Dec. 29, 2021

(30) Foreign Application Priority Data

Dec. 28, 2021 (KR) .......................... 10-2021-0189229

(51) Int. Cl.
*H04L 67/104* (2022.01)
*H04L 43/0852* (2022.01)
*H04L 67/1061* (2022.01)

(52) U.S. Cl.
CPC ...... *H04L 67/1044* (2013.01); *H04L 43/0852* (2013.01); *H04L 67/1061* (2013.01)

(58) Field of Classification Search
CPC ............. H04L 67/1044; H04L 43/0852; H04L 67/1061
See application file for complete search history.

(56) References Cited

U.S. PATENT DOCUMENTS

2022/0095250 A1\* 3/2022 Lee .......................... G01S 5/021
2022/0287000 A1\* 9/2022 Bao ........................... G01S 5/10

FOREIGN PATENT DOCUMENTS

WO    WO-2022150117 A1 \* 7/2022
WO    WO-2022155013 A1 \* 7/2022

OTHER PUBLICATIONS

Kim et al. Constructing Internet Coordinate System Based on Delay Measurement; Jun. 2005; IEEE/ACM Transactions on Networking, vol. 13, No. 3; Jun. 2005 section V and figure 5.\*

\* cited by examiner

*Primary Examiner* — Jay P Patel
(74) *Attorney, Agent, or Firm* — Morgan, Lewis & Bockius LLP

(57) ABSTRACT

A method for generating and managing a 3D coordinate system based on a transmission delay with an O(N) overhead by calculating a transmission delay between large-scale P2P nodes may comprise: generating a coordinate system and setting a node located at an origin of the coordinate system as a block generation node; calculating coordinates of a new node when an additional transmission delay occurs in a process of measuring a transmission delay from the block generation node to another node and requesting coordinates; performing self-cross check in which the block generation node periodically calculates coordinates thereof again; and updating coordinates of nodes comprising the origin of the coordinate system by reflecting a change in a transmission delay between nodes according to a network state change, based on a result of the self-cross check.

8 Claims, 12 Drawing Sheets

METHOD FOR GENERATING AND MANAGING THREE-DIMENSIONAL COORDINATE SYSTEM BASED ON TRANSMISSION DELAY HAVING O(N) OVERHEAD

CROSS-REFERENCE TO RELATED APPLICATIONS

This application claims priority to Korean Patent Application No. 10-2021-0189229 filed on Dec. 28, 2021, with the Korean Intellectual Property Office (KIPO), the entire contents of which are hereby incorporated by reference.

BACKGROUND

1. Technical Field

The present disclosure relates to a method for establishing a three-dimensional (3D) coordinate system based on a transmission delay, and more particularly, to a method for generating and managing a 3D coordinate system based on a transmission delay having an O(N) overhead, for a blockchain service and system that needs to transmit block data and an agreement message within a limited transmission delay time.

2. Related Art

Generally, a network between nodes is not connected in a straight line with the shortest distance. Thus, a transmission delay may not be recognized merely with a physical position in which a node is located.

To effectively configure a peer-to-peer (P2P) path network between block chain nodes, recognition of each node-to-node transmission delay is essential. However, due to a different node-to-node transmission delay according to network configuration and state, each node needs to transmit a control message for measuring transmission delays in all the other nodes to recognize node-to-node transmission delays for nodes constituting a P2P network. Thus, control message transmission of $O(N^2)$ is required.

To transmit a message between nodes through a network, several intermediate nodes, such as routers and switches, on an end-to-end path have to be gone through as shown in FIG. 1. Moreover, a transmission delay may change with a network state, e.g., congestion, over time, in a link on an intermediate path. Thus, to measure a transmission delay from a random node #i (i indicates a random natural number) to another node, a control message for transmission delay recognition has to be transmitted to all nodes. As such, in order for each node to independently recognize a network state such as a transmission delay, control message transmission of $O(N^2)$ is required.

A number of control messages described above may impose a burden on a P2P network, and it may take a long time until exchange of all control messages is completed.

SUMMARY

The present disclosure is proposed to solve these problems and aims to provide a method for generating and managing a 3D coordinate system based on a transmission delay with O(N) overhead, whereby a high-dimensional coordinate system of three or more dimensions may be effectively established based on a transmission delay at all nodes in a network to solve a problem of not being able to represent a transmission delay between nodes with several detour paths in a two-dimensional (2D) coordinate system.

The present disclosure also aims to provide a method for generating and managing a 3D coordinate system based on a transmission delay with O(N) overhead, which may be used to reduce the number of control messages for network state recognition and to rapidly recognize a transmission delay.

According to an exemplary embodiment of the present disclosure, a method for generating and managing a three-dimensional (3D) coordinate system based on a transmission delay with an O(N) overhead by calculating a transmission delay between large-scale peer-to-peer (P2P) nodes may comprise: generating a coordinate system and setting a node located at an origin of the coordinate system as a block generation node; calculating coordinates of a new node when an additional transmission delay occurs in a process of measuring a transmission delay from the block generation node to another node and requesting coordinates; performing self-cross check in which the block generation node periodically calculates coordinates thereof again; and updating coordinates of nodes comprising the origin of the coordinate system by reflecting a change in a transmission delay between nodes according to a network state change, based on a result of the self-cross check.

The method further may comprise: after generating the coordinate system and setting the node located at the origin as the block generation node, setting a straight line between the block generation node and a first node as an x-axis; deriving a y-axis candidate such that a plane formed by the block generation node, the first node, and a second node is an x-y plane; and deriving a z-axis candidate that is perpendicular to the x-y plane.

The calculating of the coordinates of the new node may comprise: measuring a transmission delay between a minimum of three or more existing nodes of the coordinate system and the new node; and calculating the coordinates of the new node by using a transmission delay between each of the coordinates of the existing nodes and the new node.

The performing of the self-cross check may comprise: newly calculating coordinates of the origin; and re-defining the coordinate system when the coordinates of the origin deviate largely from newly calculated coordinates.

According to another exemplary embodiment of the present disclosure, an apparatus for generating and managing a three-dimensional (3D) coordinate system based on a transmission delay with an O(N) overhead by calculating a transmission delay between large-scale peer-to-peer (P2P) nodes may comprise: a processor; and a memory storing at least one command executed by the processor, wherein the at least one command causes the processor, when executed, to: generate a coordinate system and set an origin of the coordinate system as a block generation node; calculate coordinates of a new node when an additional transmission delay occurs in a process of measuring a transmission delay from the block generation node to another node and requesting coordinates; perform self-cross check in which the block generation node periodically calculates coordinates thereof again; and update coordinates of nodes comprising the block generation node by reflecting a change in a transmission delay between nodes according to a network state change, based on a result of the self-cross check.

The at least one command may further cause the processor to: after generating the coordinate system and setting the node located at the origin of the coordinate system as the block generation node, set a straight line between the block generation node and a first node as an x-axis; derive a y-axis candidate such that a plane formed by the block generation node, the first node, and a second node is an x-y plane; and derive a z-axis candidate that is perpendicular to the x-y plane.

The at least one command may further cause the processor to: in calculating the coordinates of the new node, measure a transmission delay between a minimum of three or more existing nodes of the coordinate system and the new node; and calculate the coordinates of the new node by using a transmission delay between each of the coordinates of the existing nodes and the new node.

The at least one command may further cause the processor to: in performing the self-cross check, newly calculate coordinates of the origin; and re-define the coordinate system when the coordinates of the origin deviate largely from newly calculated coordinates.

DETAILED DESCRIPTION OF THE EMBODIMENTS

Figure 1:
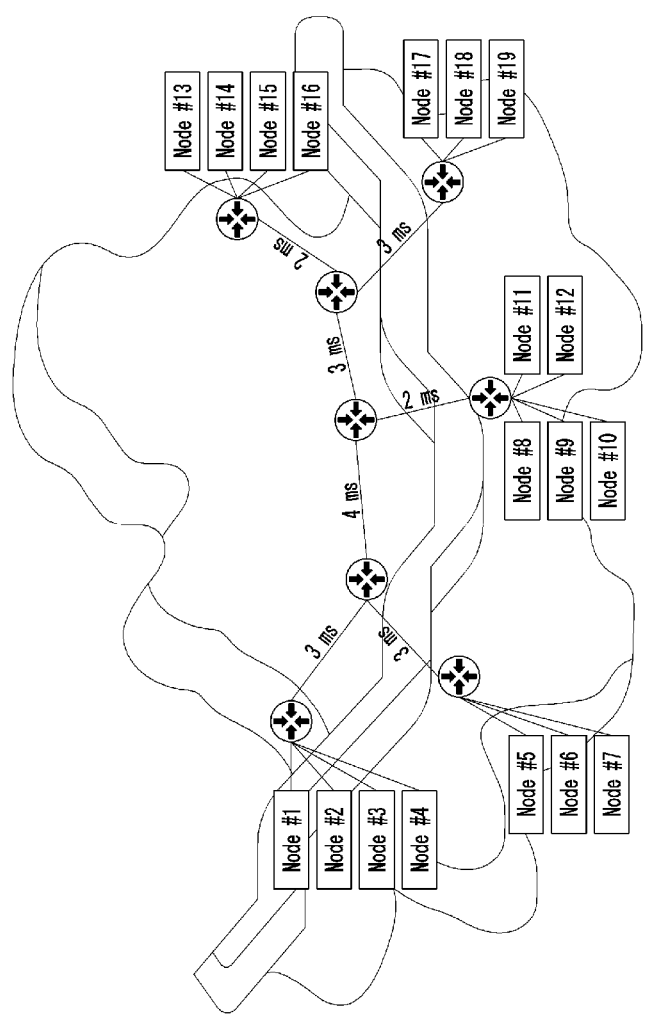
FIG. 1 illustrates an example of a network topology.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated descriptions thereof will be omitted.

Figure 2:
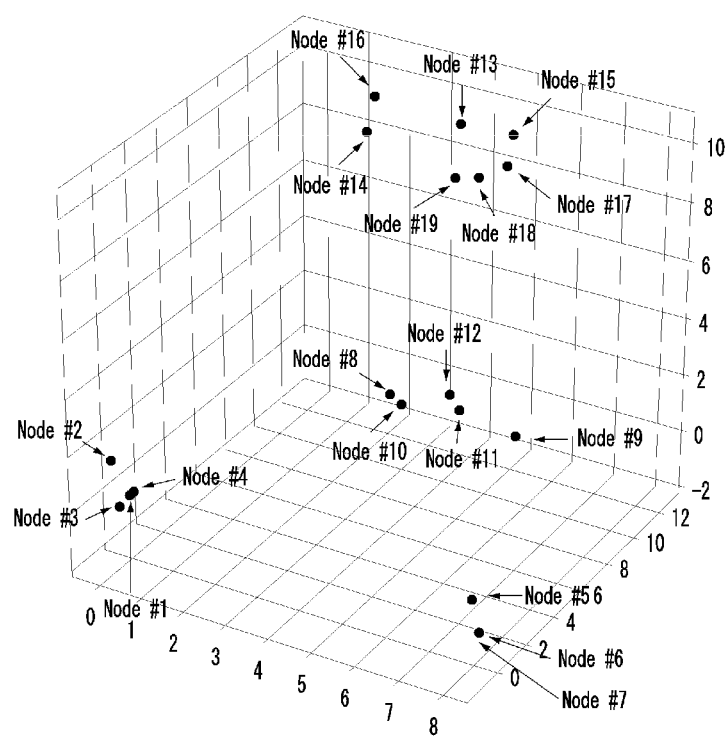
FIG. 2 illustrates an example of a transmission delay-based approximation three-dimensional (3D) coordinate system for the network topology of FIG. 1.

FIG. 1 illustrates an example of a network topology. FIG. 2 illustrates an example of a transmission delay-based approximation three-dimensional (3D) coordinate system for the network topology of FIG. 1. FIGS. 3A to 3F are graphs showing an error rate in the transmission delay-based 3D coordinate system of FIG. 2.

Referring to FIG. 1, Node #1 to Node #19 may be connected to one another through a plurality of switches. The Node #1 to Node #4 connected to a first switch may be connected to Node #5 to Node #7 connected to a second switch, through a third switch. A transmission delay between the first switch and the third switch may be about 3 ms, and a transmission delay between the second switch and the third switch may be about 3 ms, such that a transmission delay between the first switch and the second switch may be about 6 ms.

Similarly, Node #8 to Node #12 connected to a fifth switch may be connected to the third switch and a sixth switch through a fourth switch. Node #13 to Node #16 connected to a seventh switch may be connected to Node #17 to Node #19 connected to an eight switch, through the sixth switch.

A transmission delay between the third switch and the fourth switch may be about 4 ms, a transmission delay between the fourth switch and the fifth switch may be about 2 ms, a transmission delay between the fourth switch and the sixth switch may be about 3 ms, a transmission delay between the sixth switch and the seventh switch may be about 2 ms, and a transmission delay between the sixth switch and the eighth switch may be about 3 ms.

The above-described transmission delays may be set values or actually measured values. Herein, each node and switch may refer to physical positions.

Considering the above-described network topology, in the current embodiment, the number of control messages in a network may be reduced and a transmission delay may be quickly recognized, based on a multi-dimension coordinate system with a higher dimension than a two-dimension.

Accordingly, an approximate 3D coordinate system corresponding to the network topology of FIG. 1 is as shown in FIG. 2. FIG. 2 illustrates a transmission delay-based approximation 3D coordinate system generated based on transmission delays actually measured in all nodes of the network of FIG. 1 through simulation.

As shown in FIG. 2, nodes connected to each switch form a group and are located in the 3D coordinate system.

When the transmission delay-based coordinate system may be generated in this way, a transmission delay may be quickly recognized with high accuracy by calculating a distance between two random nodes on the 3D coordinate system as shown in FIGS. 3A to 3F. In this case, the higher the dimension of the coordinate system is, the higher the accuracy may be.

Figure 3A:
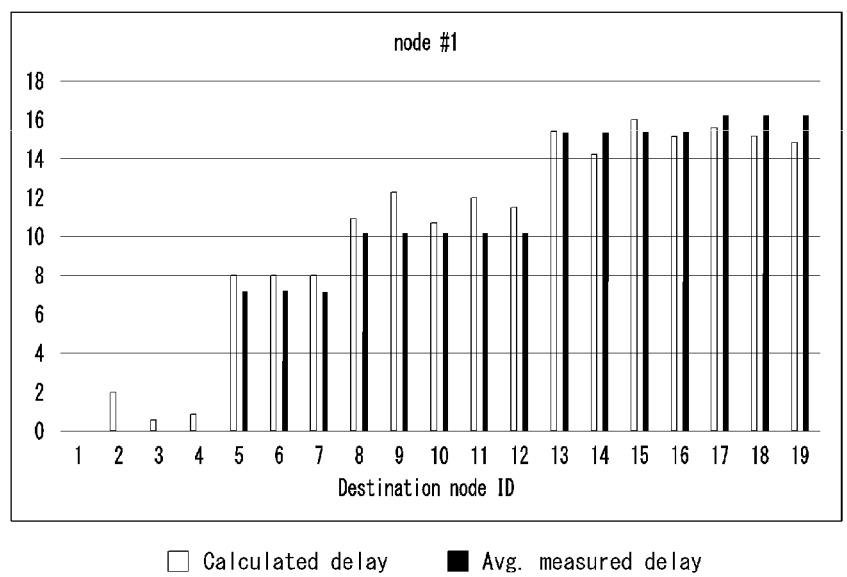
FIGS. 3A to 3F are graphs showing an error rate in the transmission delay-based 3D coordinate system of FIG. 2.

FIG. 3A shows a calculated transmission delay and an average (Avg.) measured transmission delay between Node #1 and each of the other destination nodes Node #2 to Node #19, for each destination node.

Figure 3B:
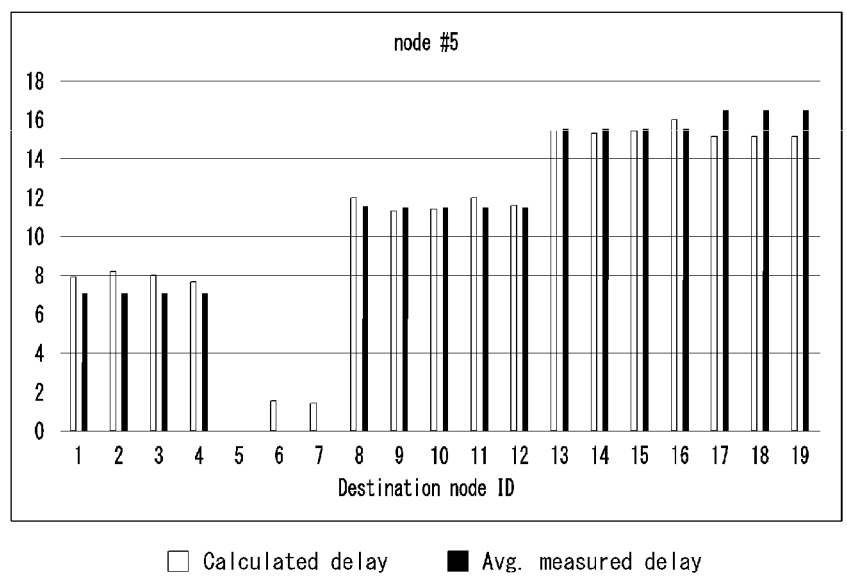

FIG. 3B shows a calculated transmission delay and an average (Avg.) measured transmission delay between Node #5 and each of the other destination nodes Node #1 to Node #4 and Node #6 to Node #19, for each destination node.

Figure 3C:
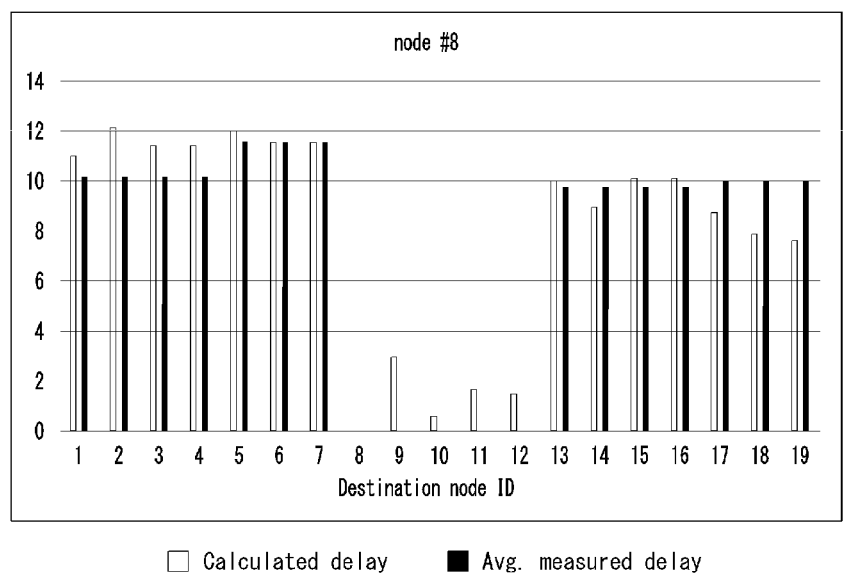
Figure 3D:
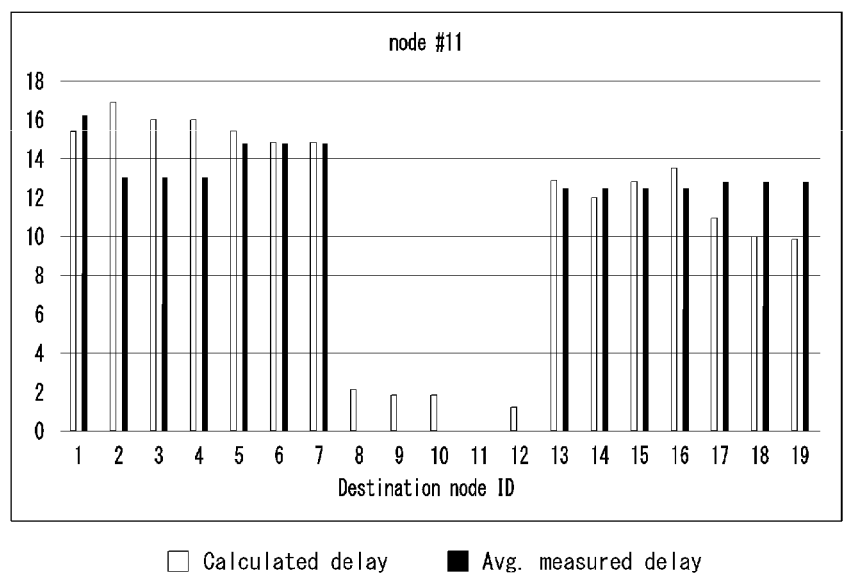

FIG. 3C shows a calculated transmission delay and an average (Avg.) measured transmission delay between Node #8 and each of the other destination nodes Node #1 to Node #7 and Node #9 to Node #19, for each destination node FIG. 3D shows a calculated transmission delay and an average (Avg.) measured transmission delay between Node #11 and each of the other destination nodes Node #1 to Node #10 and Node #12 to Node #19, for each destination node.

Figure 3E:
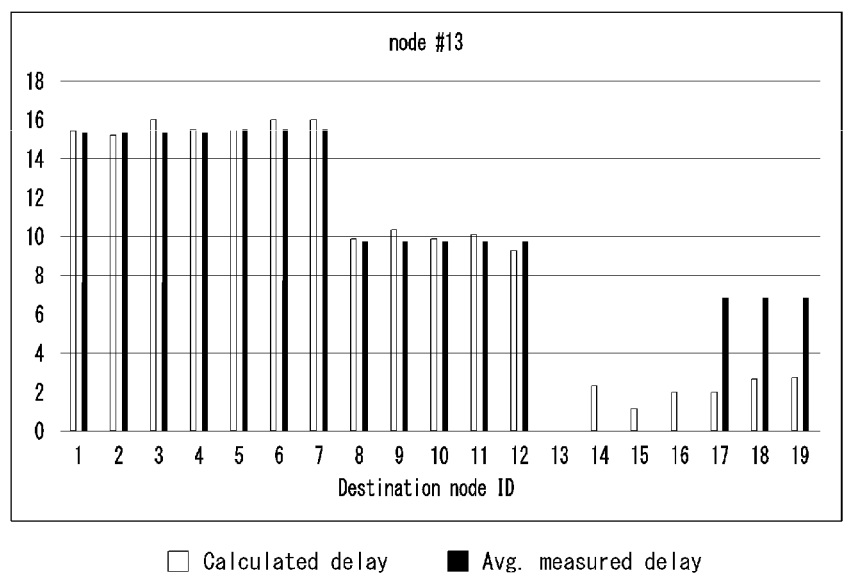

FIG. 3E shows a calculated transmission delay and an average (Avg.) measured transmission delay between Node #13 and each of the other destination nodes Node #1 to Node #12 and Node #14 to Node #19, for each destination node.

Figure 3F:
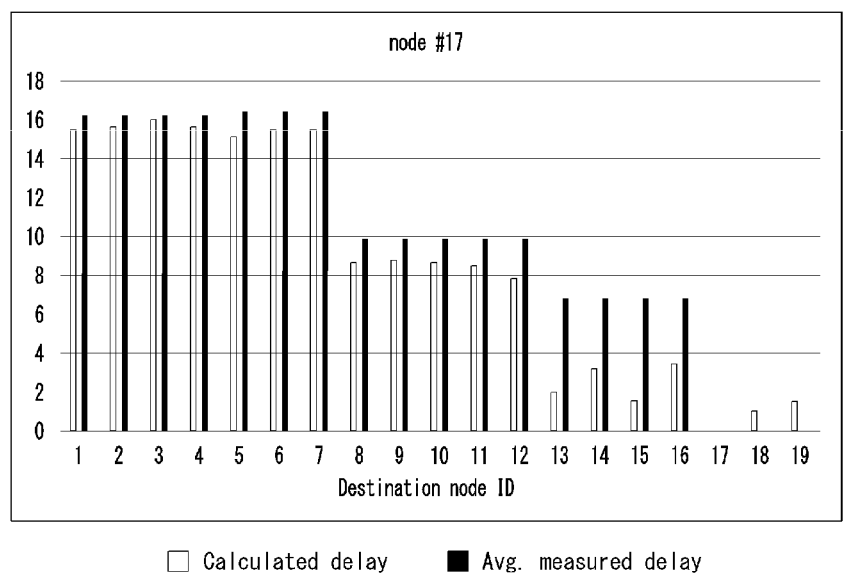

FIG. 3F shows a calculated transmission delay and an average (Avg.) measured transmission delay between Node #17 and each of the other destination nodes Node #1 to Node #16 and Node #18 and Node #19, for each destination node.

Thus, the present disclosure proposes a scheme to efficiently generate the transmission delay-based 3D coordinate system with a small number of control messages of O(N) and a scheme to improve the accuracy of the coordinate system in a time-varying network environment.

The current embodiment provides protocol and algorithm for monitoring a network state of a large-scale P2P node-to-node path requiring O(N) control messages. That is, a transmission delay measurement scheme and a 3D coordinate system generation scheme with O(N) overhead between large-scale P2P nodes will be described, and an overdetermined system supporting smooth 3D coordinate system generation and a self-cross check scheme for improving the accuracy of the 3D coordinate system will be described.

Figure 4:
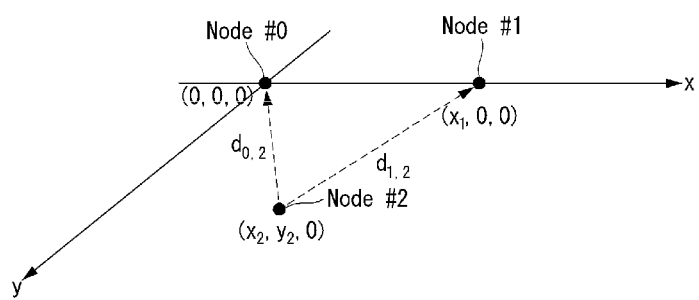
FIG. 4 is an example diagram for describing a process of determining a y-axis such that a plane formed by three nodes is an x-y plane (hereinafter, briefly referred to as a "y-axis determining process"), in a method for generating and managing a transmission delay-based 3D coordinate system with O(N) overhead (hereinafter, briefly referred to as a "3D coordinate system generation method"), according to an embodiment of the present disclosure.
Figure 5:
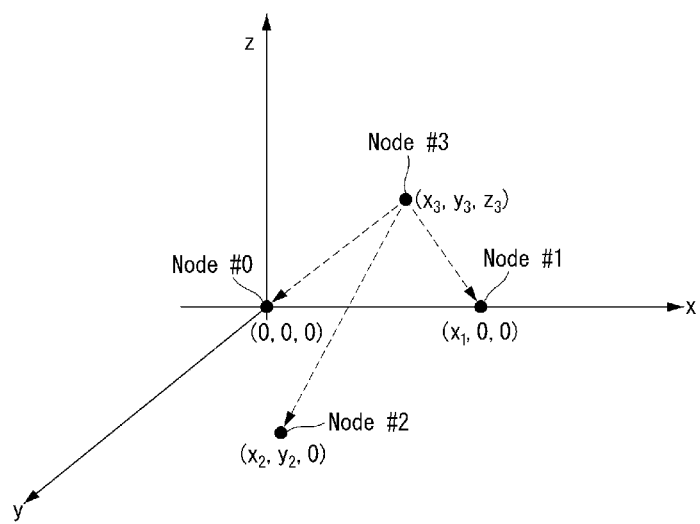
FIG. 5 is an example diagram for describing a process of determining a z-axis perpendicular to the x-y plane of FIG. 4 and coordinates of a fourth node.

FIG. 4 is an example diagram for describing a process of determining a y-axis such that a plane formed by three nodes is an x-y plane (hereinafter, briefly referred to as a "y-axis determining process"), in a method for generating and managing a transmission delay-based 3D coordinate system with O(N) overhead (hereinafter, briefly referred to as a "3D coordinate system generation method"), according to an embodiment of the present disclosure. FIG. 5 is an example diagram for describing a process of determining a z-axis perpendicular to the x-y plane of FIG. 4 and coordinates of a fourth node.

In the 3D coordinate system generation method of the current embodiment, all P2P participating nodes may exist on a 3D coordinate system established on a Euclidean space, and a Euclidean distance between two nodes may mean a transmission delay between the two nodes.

As shown in FIGS. 4 and 5, an O(N) network state monitoring protocol and a transmission delay-based 3D coordinate system generation algorithm will be described below.

Step 1) Set Node #0 to an origin (0, 0, 0) of a coordinate system.

Step 2) Set an x-axis and coordinates of Node #1.

Step 2-1) Select random Node #1 from among P2P participating nodes.

Step 2-2) Node #1 measures a transmission delay $d_{0,1}$ between Node #1 and Node #0 by exchanging a control message with Node #0.

Step 2-3) Define a straight line passing through Node #0 and Node #1 as the x axis of the coordinate system.

Step 2-4) Define a measured transmission delay $d_{0,1}$ as an x coordinate of Node #1 (Coordinates of Node #1: $(x_1,0,0)$).

Step 3) Set a y-axis and coordinates of Node #2.

Step 3-1) Select random Node #2 from among P2P participating nodes.

Step 3-2) Derive a y-axis such that a plane formed by Node #0, Node #1, and Node #2 is an x-y plane (see FIG. 4).

Step 3-3) Measure in Node #2 a transmission delay $d_{0,2}$ between Node #0 and Node #2 and a transmission delay $d_{1,2}$ between Node #1 and Node #2 by exchanging control messages with Node #0 and Node #1.

Step 3-4) Determine coordinates $(x_2, y_2, 0)$ of Node #2 according to Equation 1 and Equation 2 provided below.

$$x_2 = \frac{d_{0,2}^2 + d_{0,1}^2 - d_{1,2}^2}{2d_{0,1}}$$ [Equation 1]

$$y_2 = \sqrt{d_{0,2}^2 - \left(\frac{d_{0,2}^2 + d_{0,1}^2 - d_{1,2}^2}{2d_{0,1}}\right)^2}$$ [Equation 2]

Step 3-5) When $y_2$ is an imaginary number or 0, the step goes to Step 3-1), otherwise, the step goes to Step 4).

Step 4) Derive a z-axis candidate that is perpendicular to the x-y plane and calculate coordinates of Node 3 (see FIG. 5).

Step 4-1) Select random Node #3 from among P2P participating nodes.

Step 4-2) Define a straight line passing through Node #0 and Node #3 as the z-axis.

Step 4-3) Measure a transmission delay $d_{0,3}$ between Node #0 and Node #3, a transmission delay $d_{1,3}$ between Node #1 and Node #3, and a transmission delay $d_{2,3}$ between Node #2 and Node #3, by exchanging control messages between Node #3 and Node #0, Node #1, and Node #2.

Step 4-4) Determine coordinates $(x_3, y_3, z_3)$ of Node #3 according to Equation 3 and Equation 5 provided below.

$$x_3 = \frac{d_{0,1}^2 + d_{0,3}^2 - d_{1,3}^2}{2d_{0,1}}$$ [Equation 3]

$$y_3 = \frac{d_{0,3}^2 - 2x_2 x_3 + y_2^2 - d_{2,3}^2 - x_2^2}{2y_2}$$ [Equation 4]

$$z_3 = \sqrt{d_{0,3}^2 - x_3^2 - y_3^2}$$ [Equation 5]

Step 4-5) When $z_3$ is an imaginary number or 0, the step goes to Step 4-1), otherwise, the step goes to Step 5).

Step 5) Calculate coordinates of random Node #i with unknown coordinates.

Step 5-1) Select random Node #i from among P2P participating nodes.

Step 5-2) Select three random reference nodes with known coordinates to measure a transmission delay through control message exchange. For example, when Nodes #0, #1, and #2 are selected, a transmission delay $d_{0,i}$ between Node #i and Node #0, a transmission delay $d_{1,i}$ between Node #1 and Node #i, a transmission delay $d_{2,i}$ between Node #2 and Node #i, and a transmission delay $d_{3,i}$ between Node #3 and Node #i, by exchanging control messages between Node #i and Node #0, Node #1, and Node #2.

Step 5-3) Calculate coordinates $(x_i, y_i, z_i)$ of Node #i through Equation 6 provided below.

$$\begin{bmatrix} x_1 & y_1 & z_1 \\ x_2 & y_2 & z_2 \\ x_3 & y_3 & z_3 \end{bmatrix} \begin{bmatrix} x_i \\ y_i \\ z_i \end{bmatrix} = \begin{bmatrix} (d_{0,i}^2 + x_1^2 + y_1^2 + z_1^2 - d_{1,i}^2)/2 \\ (d_{0,i}^2 + x_2^2 + y_2^2 + z_2^2 - d_{2,i}^2)/2 \\ (d_{0,i}^2 + x_3^2 + y_3^2 + z_3^2 - d_{3,i}^2)/2 \end{bmatrix}$$ [Equation 6]

Equation 6 corresponds to a case where there are inverse matrices of matrices $x_1, y_1, z_1, \ldots, x_3, y_3,$ and $z_3$.

Step 6) When coordinates of all P2P participating nodes are allocated, a 3D coordinate system establishment and coordinate allocation process may be terminated, otherwise, the step goes to Step 5).

Figure 6:
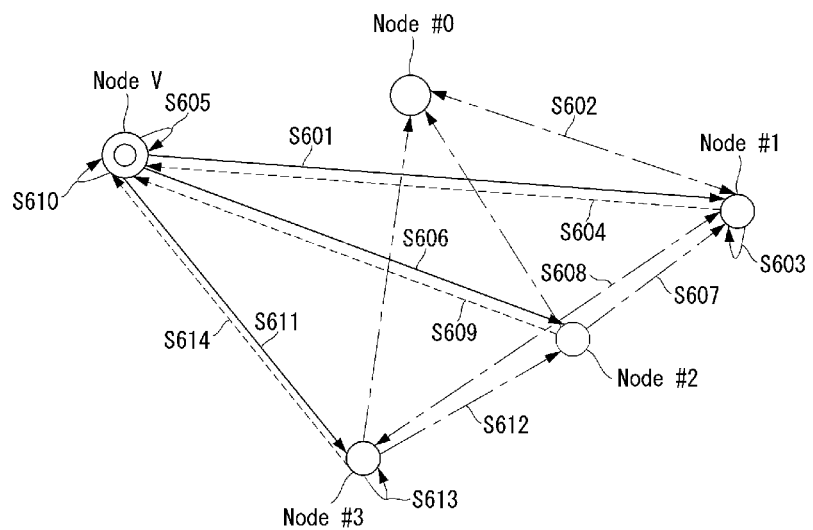
FIG. 6 is a graph for describing an overall control flow employing the 3D coordinate system generation method of FIG. 4.

The O(N) network status monitoring protocol and transmission delay-based 3D coordinate system generation algorithm according to the above-described steps may be summarized and shown in FIG. 6.

FIG. 6 is a graph for describing an overall control flow employing the 3D coordinate system generation method of FIG. 4.

Referring to FIG. 6, a verification node Node V transmits a node identifier (ID) and an Internet protocol (IP) address of Node #0 or coordinate information corresponding thereto to the first node Node #1 in operation S601. The first node may measure a round trip time (RTT) of the 0th node Node #0 in operation S602, and calculate coordinates of the first node in operation S603. The first node may transmit its coordinates to the verification node in operation S604.

The verification node Node V may receive coordinates from the first node, in operation S605. In this case, the verification node may request coordinate identification from new nodes with unknown coordinates.

The verification node Node V may transmit a node ID and an IP address or coordinate information of Node #0 and an IP address or coordinate information of Node #1 to the second node Node #2, in operation S606. The second node may measure an RTT of the 0th node Node #0 and an RTT of the first node, in operation S607. Then, the second node may calculate its coordinates based on the RTTs. The second node may transmit its coordinates to the verification node or transmit a not-available message to the verification node, in operation S609.

When the verification node Node V receives coordinates from the second node, the verification node Node V may request coordinate identification from new nodes with unknown coordinates. Moreover, the verification node may be configured to transmit an IP address and coordinate information of other nodes to the second node or perform setting update, when the verification node receives a non-available message from the second node, in operation S610.

The verification node Node V may transmit a node ID and an IP address or coordinate information of Node #0, an IP address or coordinate information of Node #1, and an IP address or coordinate information of Node #2 to the third node Node #3, in operation S611. The third node may measure an RTT of the 0th node Node #0, an RTT of the first node, and an RTT of the second node, in operations S608 and S612. Then, the third node may calculate its coordinates based on the RTTs, in operation S613. The third node may transmit its coordinates to the verification node or transmit a not-available message to the verification node, in operation S614.

Meanwhile, a case may occur where a node-to-node network state is unstable or coordinates of another node may not be obtained. In this case, when the origin node Node #0 and three reference nodes are used, an inverse matrix of Equation 6 may not exist. The origin node may be referred to as an orderer or a block generation node. Moreover, in a process of measuring a transmission delay and requesting coordinates in another node, an additional transmission delay may occur. In order to prepare for such a case, in the current embodiment, an overdetermined system may be configured which measures a transmission delay by exchanging control messages with four or more nodes and requests coordinates, thereby obtaining an approximated solution.

Figure 7:
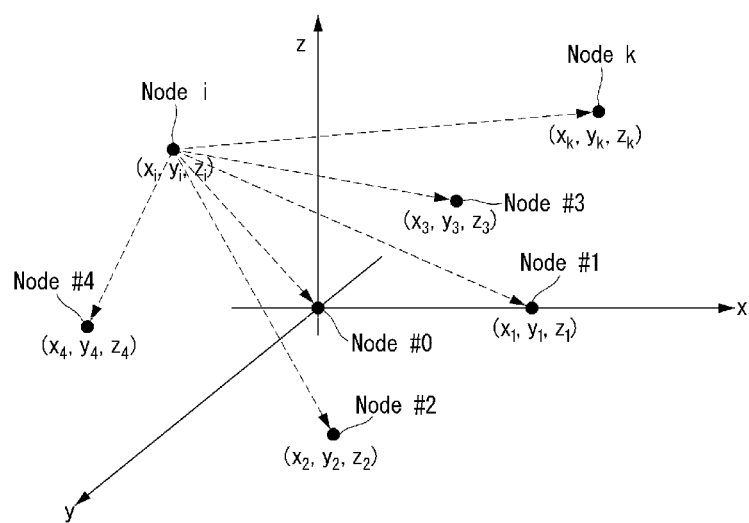
FIG. 7 is an example diagram for describing an overdetermined system to cope with an unstable network likely to occur in the 3D coordinate system generation method of FIG. 4.

FIG. 7 is an example diagram for describing an overdetermined system to cope with an unstable network likely to occur in the 3D coordinate system generation method of FIG. 4.

Referring to FIG. 7, a 3D coordinate system generation method reflecting the overdetermined system may calculate coordinates of each node by adding the fourth node Node #4, an ith node Node i, and a kth node Node k as well as the 0th node and the first to third nodes.

That is, a 3D coordinate system generating apparatus may set a node located at the origin (Node #0) as a block generation node, define a straight line between the block generation node and the first node as an x axis, derive an y axis coordinate such that a plane formed by the first node and the second node is an x-y plane, and derive a z axis coordinate perpendicular to the x-y plane, thus determining a 3D coordinate system.

Moreover, the 3D coordinate system generating apparatus may measure a transmission delay between a new node and a minimum of existing three or more nodes, and calculate coordinates of the new node by using coordinates of the existing nodes and the measured transmission delay.

According to the above-described structure, when an additional transmission delay occurs in a process of measuring a transmission delay and requesting coordinates in another node, a new 3D coordinate system may be effectively generated by changing the new node to a new block generation node.

The above-described overdetermined system may be expressed as Equation 7 provided below. The above-described approximate solution may be expressed as Equation 8 provided below.

$$\begin{bmatrix} x_1 & y_1 & z_1 \\ x_2 & y_2 & z_2 \\ x_3 & y_3 & z_3 \\ \cdots & \cdots & \cdots \\ x_k & y_k & z_k \end{bmatrix} \begin{bmatrix} x_i \\ y_i \\ z_i \end{bmatrix} = \begin{bmatrix} (d_{0,i}^2 + x_1^2 + y_1^2 + z_1^2 - d_{1,i}^2)/2 \\ (d_{0,i}^2 + x_2^2 + y_2^2 + z_2^2 - d_{2,i}^2)/2 \\ (d_{0,i}^2 + x_3^2 + y_3^2 + z_3^2 - d_{3,i}^2)/2 \\ \cdots \\ (d_{0,i}^2 + x_k^2 + y_k^2 + z_k^2 - d_{k,i}^2)/2 \end{bmatrix}$$ [Equation 7]

$$Ax = b$$ [Equation 8]

$$\Rightarrow A^T A x = A^T b$$

$$\Rightarrow x = (A^T A)^{-1} A^T b$$

In the 3D coordinate system generation method reflecting the above-described overdetermined system, as a transmission delay of a predetermined reference number or greater from reference nodes (e.g., Node #1 to Node #7) occurs during 3D coordinate system generation based on a particular node, coordinates of a new node of self and progressive coordinates may be calculated (see Table 1).

TABLE 1

| Node ID | Delay from reference nodes (reference node coordinates) → Delay | Self & Progressive coordinates (New nodes coordinates) |
|---|---|---|
| #1 | (0, 0, 0) → 3 | (3, 0, 0) |
| #2 | (0, 0, 0) → 7.2111 | (2.6667, 6.6999, 0) |
|    | (3, 0, 0) → 6.7082 | (2.6667, −6.6999, 0) |
| #3 | (0, 0, 0) → 2.4495 | (−2, 1.0945, 0.8955) |
|    | (3, 0, 0) → 5.1962 | (−2, 1.0945, −0.8955) |
|    | (2.6667, 6.6999, 0) → 7.3485 | (−2, 1.−0945, 0.8955) |
|    | (2.6667, −6.6999, 0) → 7.3485 | (−2, 1.−0945, −0.8955) |
| #4 | (0, 0, 0) → 3.1515 | Finalized |
|    | (3, 0, 0) → 2.9887 | (2.6667, 6.6999, 0) |
|    | (2.6667, 6.6999, 0) → 7.3446 | (−2, 1.0945, 0.8955) |
|    | (2.6667, −6.6999, 0) → 7.3446 | (1.6667, −0.0672, 2.6739) |
|    | (−2, 1.0945, 0.8955) → 4.2375 | |
|    | (−2, 1.0945, −0.8955) → 4.2375 | |
|    | (−2, 1.−0945, 0.8955) → 4.2375 | |

TABLE 1-continued

| Node ID | Delay from reference nodes (reference node coordinates) → Delay | Self & Progressive coordinates (New nodes coordinates) |
|---|---|---|
|    | (−2, 1.−0945, −0.8955) → 4.2375 | |
| #5 | (0, 0, 0) → 12.4576 | (7, 9.4493, 4.1115) |
|    | (3, 0, 0) → 11.0541 | |
|    | (2.6667, 6.6999, 0) → 6.5758 | |
|    | (−2, 1.0945, 0.8955) → 12.6942 | |
| #6 | (0, 0, 0) → 5.3846 | (2, 3.3821, 3.6817) |
|    | (3, 0, 0) → 5.0984 | |
|    | (2.6667, 6.6999, 0) → 5.0007 | |
|    | (−2, 1.0945, 0.8955) → 5.3848 | |
| #7 | (0, 0, 0) → 9.2805 | (−1, 7.5627, 5.2852) |
|    | (3, 0, 0) → 10.0562 | |
|    | (2.6667, 6.6999, 0) → 6.4902 | |
|    | (−2, 1.0945, 0.8955) → 7.8807 | |

Meanwhile, a node-to-node transmission delay may change with a time-varying network state change. Thus, the block generation node, Node #0 may calculate coordinates thereof by periodically using coordinates of another node and a newly measured transmission delay. In this case, when the calculated coordinates of Node #0 deviate largely from predetermined reference coordinates (0, 0, 0) or random reference coordinates, the coordinate system needs to be newly established.

Figure 8:
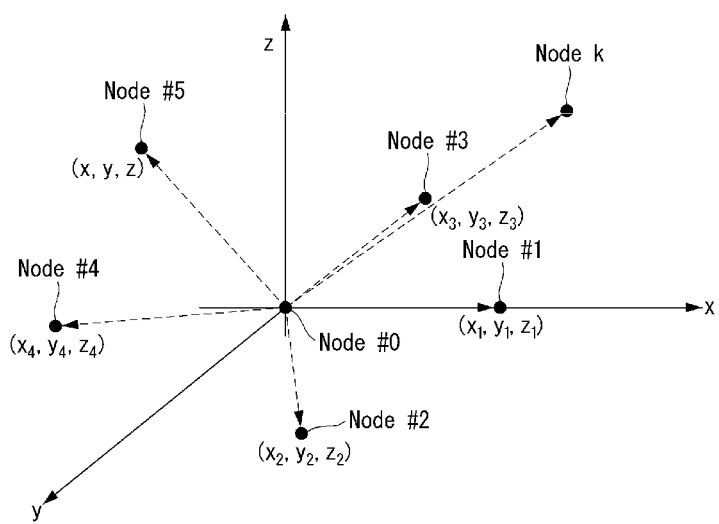
FIG. 8 is an example diagram for describing a self-cross check process for coping with a node-to-node delay change likely to occur in the 3D coordinate system generation method of FIG. 4.

FIG. 8 is an example diagram for describing a self-cross check process for coping with a node-to-node delay change likely to occur in the 3D coordinate system generation method of FIG. 4.

Referring to FIG. 8, the 3D coordinate system generation method reflecting self-cross check may include steps described below. Although the block generation node, the 0th node Node #0 is located at the reference coordinates (0, 0, 0) in FIG. 8, the following description will be made in the current embodiment on the assumption that the 0th node is moved to random coordinates $x_0$, $y_0$, $z_0$.

Step 1) The block generation node, Node #0 located at the origin selects random nodes (Node #1, . . . , Node #k).

Step 2) Node #0 measures a transmission delay $d_{0,1}$, $d_{0,2}$, . . . , $d_{0,k}$ with each of the nodes through control message exchange.

Step 53) Calculate coordinates $x_0$, $y_0$, $z_0$ of Node #0 through an inverse matrix operation of Equation 9 provided below.

$$\begin{bmatrix} x_1 & y_1 & z_1 \\ x_2 & y_2 & z_2 \\ x_3 & y_3 & z_3 \\ \cdots & \cdots & \cdots \\ x_k & y_k & z_k \end{bmatrix} \begin{bmatrix} x_0 \\ y_0 \\ z_0 \end{bmatrix} = \begin{bmatrix} (x_1^2 + y_1^2 + z_1^2 - d_{0,1}^2)/2 \\ (x_2^2 + y_2^2 + z_2^2 - d_{0,2}^2)/2 \\ (x_3^2 + y_3^2 + z_3^2 - d_{0,3}^2)/2 \\ \cdots \\ (x_k^2 + y_k^2 + z_k^2 - d_{0,k}^2)/2 \end{bmatrix}$$ [Equation 9]

Step 4) Re-establish the coordinate system when the coordinates of Node #0 deviate largely from the origin (0, 0, 0) or a predetermined reference point.

As such, according to the current embodiment of the present disclosure, when a node-to-node transmission delay changes with a time-varying network state change, the network state change may be monitored to effectively generate and manage the 3D coordinate system based on a particular reference node.

Figure 9:
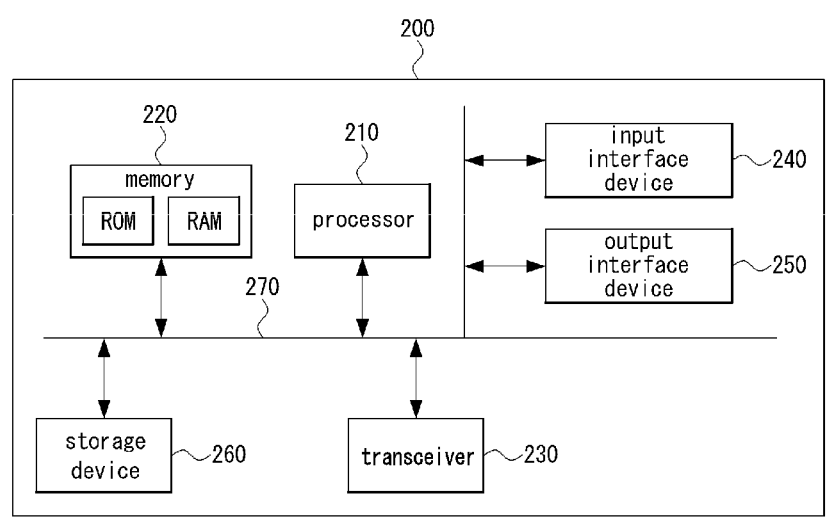
FIG. 9 is a block diagram for describing main components of an apparatus for generating and managing a transmission delay-based 3D coordinate system (hereinafter, briefly referred to as a "3D coordinate system generating apparatus"), according to another embodiment of the present disclosure.

FIG. 9 is a block diagram for describing main components of an apparatus for generating and managing a transmission delay-based 3D coordinate system (hereinafter, briefly referred to as a "3D coordinate system generating apparatus"), according to another embodiment of the present disclosure.

Referring to FIG. 9, a 3D coordinate system generating apparatus 200 may include at least one processor 210, a memory 220, and a transceiver 230 connected to a network to perform communications. In addition, the 3D coordinate system generating apparatus 200 may further include an input interface device 240, an output interface 250, a storage device 260, etc. Respective components included in the 3D coordinate system generating apparatus 200 may be connected by a bus 270 to perform communications with each other.

The processor 210 may mean a central processing unit (CPU), a graphics processing unit (GPU), or a dedicated processor on which methods according to embodiments of the present disclosure are performed. Each of the memory 220 and the storage device 260 may be configured of at least one of a volatile storage medium and a non-volatile storage medium. For example, the memory 220 may include at least one of read-only memory (ROM) and random-access memory (RAM).

Moreover, the processor 210 may execute a program command stored in at least one of the memory 220 and the storage device 260. A program command may include a command for setting a reference node to an origin of a coordinate system, a command for setting coordinates of a node, a command for determining an axis or a plane, a command for exchange control messages with a node, a command for measuring a transmission delay with the node, a command for determining an imaginary number or 0, a command for calculating coordinates, a command for setting the number of nodes more than a minimum value according to an overdetermined system, a command for monitoring occurrence of an additional transmission delay during generation of a coordinate system, a command for updating to coordinates of a new node through self-cross check, etc.

According to the present disclosure, there may be provided a method for generating and managing a 3D coordinate system based on a transmission delay having an O(N) overhead, useful for a blockchain service and system that needs to transmit block data and an agreement message within a limited transmission delay time.

Moreover, according to the present disclosure, using the 3D coordinate system, an actual transmission delay through a network may be quickly calculated simply through a Euclidean distance between two nodes. Furthermore, through rapid calculation of a transmission delay in each node in the network, a node-to-node transmission delay required for establishment of a block chain P2P network may be effectively recognized.

In addition, according to the present disclosure, there may be provided a transmission delay measurement scheme with O(N) overhead and a 3D coordinate system generation scheme, which are capable of efficiently calculating a transmission delay between large-scale P2P nodes.

According to the present disclosure, when an additional transmission delay occurs in a process of measuring a transmission delay and requesting coordinates in another node, the overdetermined system may be configured using only three reference points even when there is no inverse matrix, thus obtaining an approximate solution.

According to the present disclosure, as the block generation node, which is the origin, periodically re-calculates coordinates thereof, the coordinates may be newly calculated and the coordinate system may be redefined based on coordinates deviating largely from the origin, even when a node-to-node transmission delay changes with a network environment change, thereby effectively reducing the cost of control messages for transmission delay check, etc.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for generating and managing a three-dimensional (3D) coordinate system based on a transmission delay with an O(N) overhead by calculating a transmission delay between large-scale peer-to-peer (P2P) nodes, the method comprising:
   generating a coordinate system and setting a node located at an origin of the coordinate system as a block generation node;
   calculating coordinates of a new node when an additional transmission delay occurs in a process of measuring a transmission delay from the block generation node to another node and requesting coordinates;
   performing self-cross check in which the block generation node periodically calculates coordinates thereof again; and
   updating coordinates of nodes comprising the origin of the coordinate system by reflecting a change in a transmission delay between nodes according to a network state change, based on a result of the self-cross check.

2. The method of claim 1, further comprising:
   after generating the coordinate system and setting the node located at the origin as the block generation node,
   setting a straight line between the block generation node and a first node as an x-axis;
   deriving a y-axis candidate such that a plane formed by the block generation node, the first node, and a second node is an x-y plane; and
   deriving a z-axis candidate that is perpendicular to the x-y plane.

3. The method of claim 2, wherein the calculating of the coordinates of the new node comprises:
   measuring a transmission delay between a minimum of three or more existing nodes of the coordinate system and the new node; and
   calculating the coordinates of the new node by using a transmission delay between each of the coordinates of the existing nodes and the new node.

4. The method of claim 3, wherein the performing of the self-cross check comprises:
  newly calculating coordinates of the origin; and
  re-defining the coordinate system when the coordinates of the origin deviate largely from newly calculated coordinates.

5. An apparatus for generating and managing a three-dimensional (3D) coordinate system based on a transmission delay with an O(N) overhead by calculating a transmission delay between large-scale peer-to-peer (P2P) nodes, the apparatus comprising:
  a processor; and
  a memory storing at least one command executed by the processor,
  wherein the at least one command causes the processor, when executed, to:
  generate a coordinate system and set an origin of the coordinate system as a block generation node;
  calculate coordinates of a new node when an additional transmission delay occurs in a process of measuring a transmission delay from the block generation node to another node and requesting coordinates;
  perform self-cross check in which the block generation node periodically calculates coordinates thereof again; and
  update coordinates of nodes comprising the block generation node by reflecting a change in a transmission delay between nodes according to a network state change, based on a result of the self-cross check.

6. The apparatus of claim 5, wherein the at least one command further causes the processor to:
  after generating the coordinate system and setting the node located at the origin of the coordinate system as the block generation node,
  set a straight line between the block generation node and a first node as an x-axis;
  derive a y-axis candidate such that a plane formed by the block generation node, the first node, and a second node is an x-y plane; and
  derive a z-axis candidate that is perpendicular to the x-y plane.

7. The apparatus of claim 6, wherein the at least one command further causes the processor to:
  in calculating the coordinates of the new node,
  measure a transmission delay between a minimum of three or more existing nodes of the coordinate system and the new node; and
  calculate the coordinates of the new node by using a transmission delay between each of the coordinates of the existing nodes and the new node.

8. The apparatus of claim 7, wherein the at least one command further causes the processor to:
  in performing the self-cross check,
  newly calculate coordinates of the origin; and
  re-define the coordinate system when the coordinates of the origin deviate largely from newly calculated coordinates.

* * * * *